United States Patent
Servel (10) Patent No.: US 9,322,671 B2
(45) Date of Patent: Apr. 26, 2016

(54) METHOD FOR DETERMINING THE POSITION OF A MAGNETIC ELEMENT USING HALL EFFECT LINEAR SENSORS AND ASSOCIATED DEVICE

(75) Inventor: Eric Servel, Roques (FR)

(73) Assignees: CONTINENTAL AUTOMOTIVE FRANCE, Toulouse (FR); CONTINENTAL AUTOMOTIVE GMBH, Hannover (DE)

(*) Notice: Subject to any disclaimer, the term of this patent is extended or adjusted under 35 U.S.C. 154(b) by 973 days.

(21) Appl. No.: 13/519,425

(22) PCT Filed: Dec. 23, 2010

(86) PCT No.: PCT/EP2010/007940
§ 371 (c)(1),
(2), (4) Date: Oct. 1, 2012

(87) PCT Pub. No.: WO2011/079939
PCT Pub. Date: Jul. 7, 2011

(65) Prior Publication Data
US 2013/0024156 A1    Jan. 24, 2013

(30) Foreign Application Priority Data
Dec. 28, 2009   (FR) .................................. 09 06361

(51) Int. Cl.
*G01D 5/14*      (2006.01)
*F16H 59/70*    (2006.01)

(52) U.S. Cl.
CPC ................. *G01D 5/145* (2013.01); *F16H 59/70* (2013.01)

(58) Field of Classification Search
CPC ............ F16H 59/105; F16H 2061/223; F16H 2061/2823; F16H 59/044; G01D 5/145; G01D 5/147; Y10T 74/20018; Y10T 74/2011; G01R 33/07; G01R 33/066; G01R 33/077
USPC ............ 324/207.11, 207.13, 207.15, 207.17, 324/207.2, 207.22, 207.24, 173, 160, 251; 338/32 H; 192/3.58; 257/E43.003, 257/E43.007, 421; 701/62
See application file for complete search history.

(56) References Cited

U.S. PATENT DOCUMENTS
7,408,343 B2    8/2008   Dmytriw et al.
9,046,383 B2 *   6/2015   Friedrich et al.
(Continued)

FOREIGN PATENT DOCUMENTS
CN     1781013 A    5/2006
CN     1975337 A    6/2007
(Continued)

OTHER PUBLICATIONS
International Search Report dated Jul. 25, 2011, in corresponding PCT application.

*Primary Examiner* — Janet Suglo
*Assistant Examiner* — Lisa Peters
(74) *Attorney, Agent, or Firm* — Young & Thompson

(57) ABSTRACT

Method for determining the position of a magnetic element on a gearbox selector of an automobile, generating a magnetic field ($\vec{V}$), the speed selector moving in two directions with respect to a longitudinal axis, a main direction and a secondary direction, the magnetic element facing a position sensor including three Hall effect cells, includes measuring three voltages ($V_1$, $V_2$, $V_3$) at the respective outputs of the three Hall effect cells oriented in the same direction and positioned as follows: two cells being aligned on a transverse axis perpendicular to the longitudinal axis, the third cell being positioned on the longitudinal axis perpendicularly to the transverse axis, passing through the other two Hall effect cells, calculating a ratiometric ratio (P) between the first, second and third voltages defined by:

$$P = k * \left( \frac{V_3 + k_1 * V}{V + k_3 * V_3} \right)$$

with $V = \sqrt{V_1^2 + V_2^2}$ and $k$, $k_1$, and $k_3$ being constants, deducing the position of the magnetic element in the secondary direction.

13 Claims, 6 Drawing Sheets

(56) References Cited

U.S. PATENT DOCUMENTS

| | | |
|---|---|---|
| 2004/0239313 A1 | 12/2004 | Godkin |
| 2006/0052911 A1* | 3/2006 | Ochs et al. ............ 701/2 |
| 2006/0065068 A1 | 3/2006 | Mizuno et al. |
| 2007/0120556 A1 | 5/2007 | Dufour et al. |
| 2008/0042644 A1 | 2/2008 | Heo et al. |
| 2008/0223650 A1 | 9/2008 | Standke |
| 2010/0145583 A1* | 6/2010 | Kamada ............ 701/62 |
| 2011/0001470 A1 | 1/2011 | Monteil et al. |
| 2011/0035121 A1* | 2/2011 | Katrak et al. ............ 701/51 |
| 2012/0025810 A1* | 2/2012 | Uhlenbruck ............ 324/207.2 |

FOREIGN PATENT DOCUMENTS

| | | |
|---|---|---|
| CN | 101297485 A | 10/2008 |
| EP | 0591113 | 9/1993 |
| EP | 0800055 | 10/1997 |
| EP | 1055914 | 11/2000 |
| EP | 1882871 | 1/2008 |
| FR | 2581002 | 10/1986 |
| FR | 2926881 | 7/2009 |
| FR | 2932880 | 12/2009 |
| GB | 2214248 | 8/1989 |
| JP | 8312766 | 11/1996 |
| JP | 2006-276983 | 10/2006 |
| WO | 97/46815 | 12/1997 |
| WO | 2009/092574 | 7/2009 |

\* cited by examiner

METHOD FOR DETERMINING THE POSITION OF A MAGNETIC ELEMENT USING HALL EFFECT LINEAR SENSORS AND ASSOCIATED DEVICE

BACKGROUND OF THE INVENTION

1. Field of the Invention

The present invention relates to a method for determining the position of a magnetic element using linear Hall effect position sensors. The invention also relates to the device allowing this method to be implemented.

More particularly, the invention is applicable to the detection of the position of a gearbox selector of a gearbox of an automobile vehicle and allows the gear ratio which is selected by the driver to be determined.

2. Description of the Related Art

The selection of a gear ratio for an automobile vehicle is generally carried out, for a manual gearbox, by a gear stick situated in the passenger compartment of the vehicle which, by means of a transmission linkage connected to an axis for selection of the gearbox ratio, allows a gear ratio to be selected in the gearbox by various systems of gears, known to those skilled in the art and not detailed here. The latter is generally situated under the vehicle and connected to the wheels and to the engine.

The gear stick can move in two perpendicular directions. This example is limited to the case of a gearbox comprising six gear ratios: $1^{st}$, $2^{nd}$, $3^{rd}$, $4^{th}$, $5^{th}$ gears and reverse gear R (cf. FIG. 2). "Speed of the vehicle" will refer to the gear ratio selected in the gearbox and "neutral" N the null gear ratio. The movement of the gear stick is transmitted, in the gearbox to the speed selection axis, also referred to as a gearbox selector, which itself moves in translation and in rotation relative to the longitudinal axis of the gearbox. By means of various mechanical gears, this translational and rotational movement of the gearbox selector allows the speed chosen by the driver to be engaged.

In order to perform certain functions of the vehicle, such as for example turn off the engine when the gearbox is in neutral in order to reduce polluting emissions, it is common to use a sensor for the position of the gearbox selector. This position sensor generally comprises a linear Hall effect cell, connected to an integrated electronic circuit. A linear Hall effect cell is understood to mean an element, made of conducting or semiconductor material, through which a current flows and which is subjected to a magnetic field perpendicular to this current, which produces an output voltage proportional to the magnetic field and to the current flowing through it. The measurement plane of the Hall effect cell is perpendicular to the magnetic field generated by the magnetic element. A linear Hall effect cell will be referred to as Hall effect cell in the following part of the description.

Figure 1:
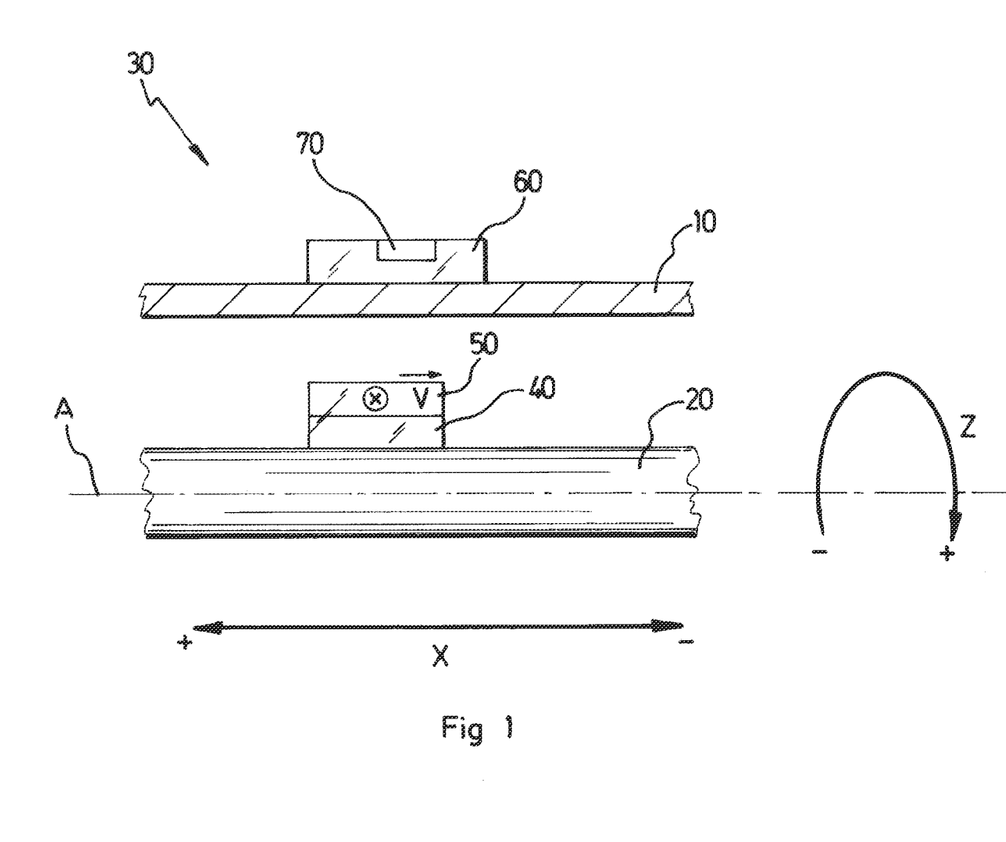
FIG. 1 shows a partial schematic view of a gearbox equipped with a position sensor according to the prior art.

As illustrated in FIG. 1, the position sensor 60 is generally situated in the housing 10 of the gearbox 30, facing a magnetic element 50 situated on the gearbox selector 20 (by a support 40) which moves, when the speeds are selected, in rotation in the main direction Z, and in translation in the secondary direction X, with respect to the longitudinal axis A of the gearbox 30. The magnetic element 50 is oriented in such a manner that it creates a magnetic field $\vec{V}$ which varies with the direction of movement of the gearbox selector 20 that it is desired to detect. In FIG. 1, the magnetic field $\vec{V}$ is oriented perpendicularly to the longitudinal axis A, and transversely with respect to the gearbox selector 20, in order to measure the rotational movement in the main direction Z of the gearbox selector 20. The orientation of the magnetic field $\vec{V}$ is illustrated more clearly in FIG. 2 which shows a top view of FIG. 1. The magnetic field $\vec{V}$ y is oriented along the transverse axis B of the gearbox 30. A Hall effect cell 70 detects the variations in the magnetic field $\vec{V}$ induced by the translational movement or in rotation (as in the example illustrated in FIG. 1) of the magnetic element 50 and thus determines the position of the gearbox selector 20.

However, this detection can only be carried out in a direction of movement of the gearbox selector 20, the Hall effect cell 70 only being sensitive to a direction of the magnetic field $\vec{V}$ generated by the magnetic element 50. In order to detect whether the gear stick 80 is, for example, in neutral N, the Hall effect cell 70 and the magnetic element 50 are positioned for determining the rotational position, in the main direction Z, of the gearbox selector 20. As previously explained and illustrated in FIG. 2, the magnetic field $\vec{V}$ created by the magnetic element 50 and detected by the position sensor 60 is oriented along the transverse axis B of the gearbox 30. If the gearbox selector 20 rotates in the positive sense, in the main direction Z, this means that one of the even speeds ($2^{nd}$ or $4^{th}$ gear) or reverse gear R is selected by the gear stick 80. If it rotates in the opposing sense, in other words negative, one of the odd speeds is selected ($1^{st}$, $3^{rd}$ or $5^{th}$ gear), and finally, if it is centered on the longitudinal axis A, then the gear stick 80 is considered to be in neutral.

Figure 2:
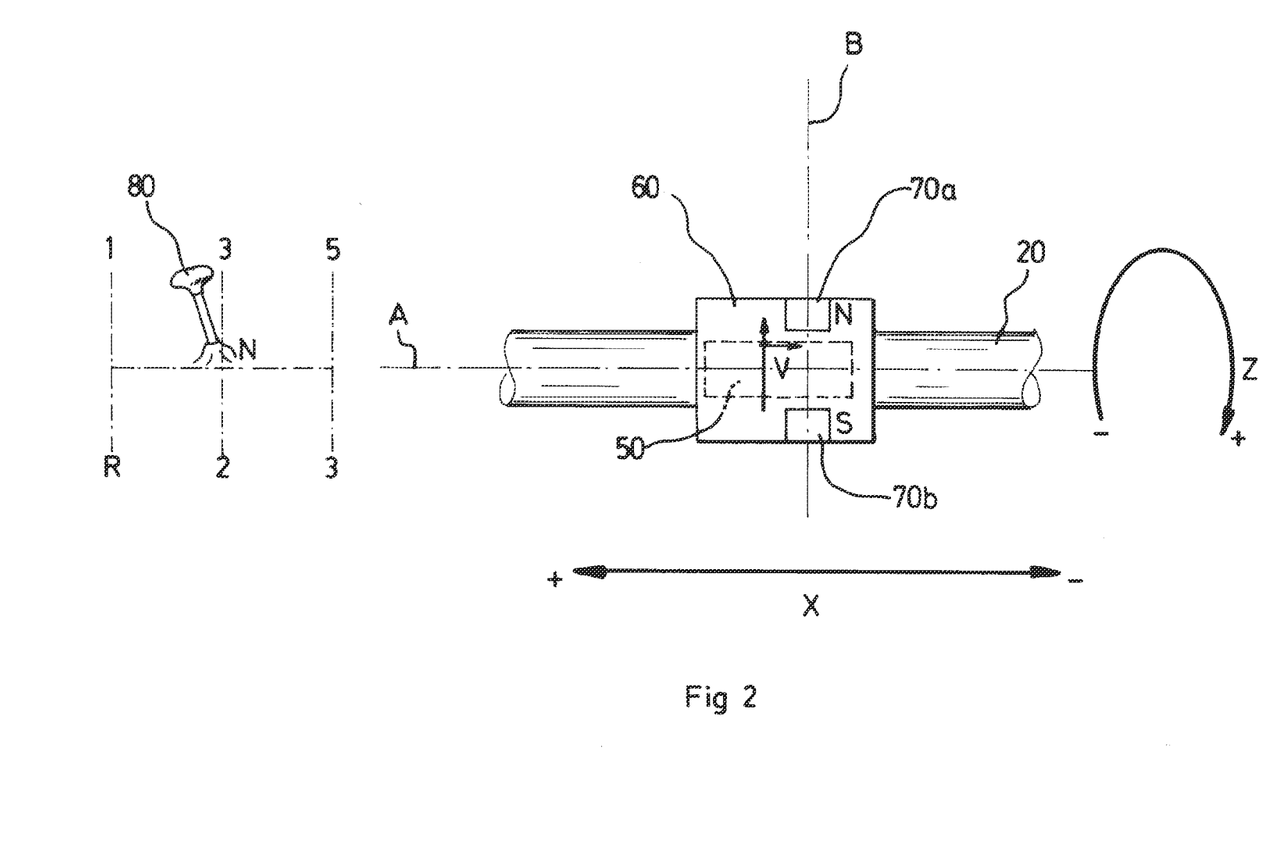
FIG. 2 shows a partial schematic top view of a gearbox equipped with a position sensor according to FIG. 1.

As illustrated in FIG. 2, in order to overcome the drifts in the magnetic element and also the variations in the distance between the magnetic element and the position sensor 60, it is common to use a ratiometric ratio between the output voltages of two Hall effect cells 70a and 70b, situated within a single position sensor 60. These Hall effect cells 70a and 70b are situated in the same measurement plane, in other words they are coplanar in the plane defined by the longitudinal axis A and the transverse axis B, and they measure the same magnetic field $\vec{V}$. Indeed, by using a ratiometric ratio between the output voltages of two Hall cells 70a, 70b, this effect is cancelled. This method is, for example, described in the document FR 2 926 881. In this document FR 2 926 881, the arctangent of the ratiometric ratio between the output voltages of two Hall cells is used in order to detect the position of the gearbox selector 20 in rotation, hence independently of certain variations.

At the present time, this detection along a single direction of movement is insufficient, and it is useful to be able to detect the speed selected precisely in order to improve the performance characteristics of the vehicle (noise, emissions) by anticipating for example the change in speed. It therefore becomes necessary to be able to detect not only the type of speed selected (even, odd, neutral), but also the actual speed, and hence to detect the movement of the gearbox selector 20 in the two directions of movement, in rotation and in translation, with respect to the longitudinal axis A of the gearbox.

For this purpose, it is usual to add (cf. FIG. 3) an additional magnetic element 500 on the gearbox selector 20, oriented in such a manner that it creates a magnetic field $\vec{V}_2$ in the second direction of movement, or secondary direction X, that it is desired to detect (in our example, the translation), together with a position sensor 600 situated facing the latter (for example on the housing 10 of the gearbox 30) comprising one or two Hall cells 700a and 700b. These are situated in the same measurement plane and oriented so as to measure this second magnetic field $\vec{V}_2$. These two Hall effect cells 700a and 700b thus each produce an output voltage proportional to the movement of the gearbox selector 20, in this case in translation, in the positive direction of the secondary direction X. This configuration (using a single Hall effect cell per sensor) is described in the document WO 97 46 815. By using two magnetic elements 50 and 500 and two position sensors 60 and 600 (each comprising one or two Hall effect cells), in other words by duplicating the device used to detect the movement of the gearbox selector 20 in one direction only, it is therefore possible to detect its movement in the two directions and hence to precisely determine the speed selected by the user via the gear stick. This solution is robust but costly, since it is necessary to add a magnetic element and a position sensor.

BRIEF SUMMARY OF THE INVENTION

The aim of the invention is therefore to provide a method for determining the position of the gearbox selector in the translational and rotational directions using a lower cost device than that of the prior art.

The aims of the invention are achieved by means of a method for determining the position of a magnetic element, situated on the gearbox selector of a gearbox of an automobile vehicle, generating a magnetic field $\vec{V}$, said gearbox selector moving in two directions with respect to a longitudinal axis, a main direction of rotation about the longitudinal axis and a secondary direction of translation along the longitudinal axis, the magnetic element being situated facing a position sensor comprising three Hall effect cells, the method consisting in measuring a first voltage, a second voltage and a third voltage at the respective outputs of a first Hall effect cell, of a second Hall effect cell and of a third Hall effect cell. The invention is noteworthy in that the three Hall effect cells are oriented in the same direction for measuring the magnetic field $\vec{V}$, and are positioned in the following manner:

- two Hall effect cells are aligned on a transverse axis perpendicular to the longitudinal axis of the gearbox selector and have a first gap between them along the transverse axis,
- the third Hall effect cell is positioned on the longitudinal axis, in other words perpendicularly to the transverse axis, passing through the other two Hall effect cells, and has a second gap along the longitudinal axis with respect to the position on this axis of the other two cells.

Said method furthermore comprises:

- a step consisting in calculating a ratiometric ratio P between the first voltage $V_1$, second voltage $V_2$ and third voltage $V_3$, in order to deduce from this the position of the magnetic element in the secondary direction of movement of the gearbox selector.

The ratiometric ratio P between the first voltage $V_1$, second voltage $V_2$ and third voltage $V_3$ is defined in the following manner:

$$P = k * \left( \frac{V_3 + k_1 * V}{V + k_3 * V_3} \right)$$

with $V=\sqrt{V_1^2+V_2^2}$, the geometric mean between the first voltage $V_1$ and second voltage $V_2$. and k, $k_1$, and $k_3$ being constants.

- a step consisting in deducing the position of the magnetic element in the secondary direction of movement of the gearbox selector, the ratio P varying linearly with the position of the magnetic element in the secondary direction of movement of the gearbox selector.

Advantageously, three Hall effect cells are used that are coplanar in a plane defined by the longitudinal and transverse axes.

In one preferred embodiment, the precise determination of the position of the gearbox selector can be carried out by choosing k=1, $k_1$=0 and $k_3$=0, in other words using a simplified expression for the ratiometric ratio P:

$$P = \frac{V_3}{V}$$

A key idea of the invention is to linearize the geometric mean V between the first voltage $V_1$ and second voltage $V_2$ in order to avoid any potential fluctuations in the values of the ratiometric ratio P due to the rotation of the magnetic element and in order to obtain a better correlation between the values of the ratiometric ratio P and the values of the movement of the gearbox selector.

In one variant embodiment, and advantageously, said method furthermore comprises a preliminary step consisting in setting the design parameters of at least one of the following elements:

- dimensions of the magnetic element,
- gap along the longitudinal axis and the transverse axis between each of the three Hall effect cells,
- gap along the longitudinal axis and the transverse axis between the magnetic element and the measurement plane of the Hall effect cells, according to a law of variation of the voltage measured at the output of each Hall effect cell, itself a function of the position of the magnetic element with respect to said Hall effect cell, in order to obtain the desired precision on the detection of the speed engaged.

Alternatively, and in order to simplify the aforementioned design parameter setting, the idea of the invention is to use identical Hall effect cells.

In a first embodiment and according to the typical configuration of a gearbox for a front-wheel-drive vehicle, the main direction of movement is that of the rotation of the gearbox selector about the longitudinal axis, and the secondary direction is the translation of the gearbox selector along the longitudinal axis.

In a second embodiment, and according to the typical configuration of a gearbox of a rear-drive vehicle, the main direction of movement is that of the translation of the gearbox selector along the longitudinal axis and the secondary direction is the rotation of the gearbox selector about the longitudinal axis.

In one preferred embodiment, the method comprises a preliminary step consisting in calculating the arctangent of the ratio between the first voltage and the second voltage in order to deduce from this the position of the magnetic element in the main direction of movement of the gearbox selector, in other words in the direction of rotation along the longitudinal axis.

The invention also provides a device for determining the position of a magnetic element situated on a gearbox selector of an automobile vehicle allowing the method described hereinabove to be implemented.

The invention also relates to any associated gearbox selector position sensor.

BRIEF DESCRIPTION OF THE DRAWINGS

Other advantages, aims and features of the invention will become apparent upon reading the description that follows, presented by way of non-limiting example, and upon examining the appended drawings in which.

DETAILED DESCRIPTION OF THE PREFERRED EMBODIMENTS

Figure 3:
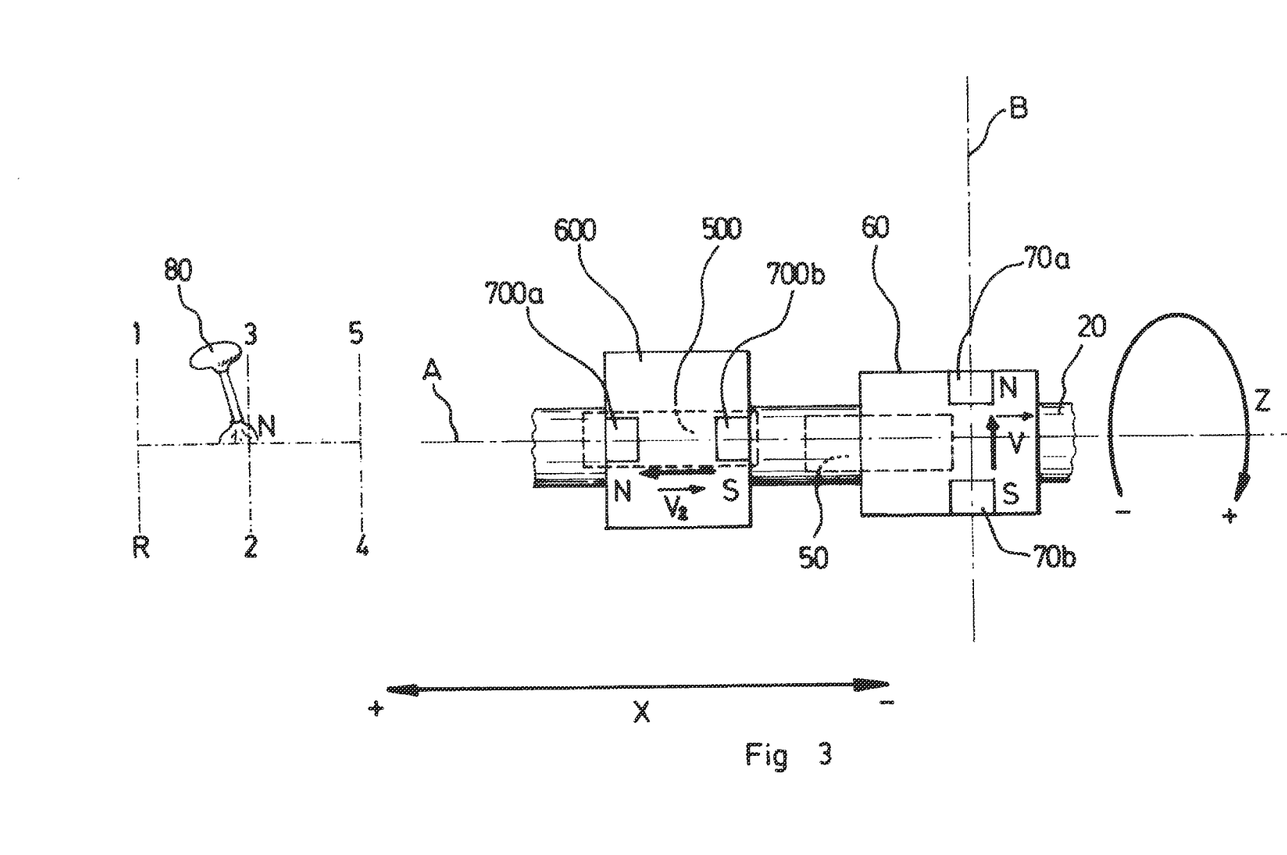
FIG. 3 is a partial schematic view of a gearbox equipped with two position sensors according to the prior art.

FIGS. 1, 2 and 3 show devices of the prior art and have been detailed previously.

Figure 4:
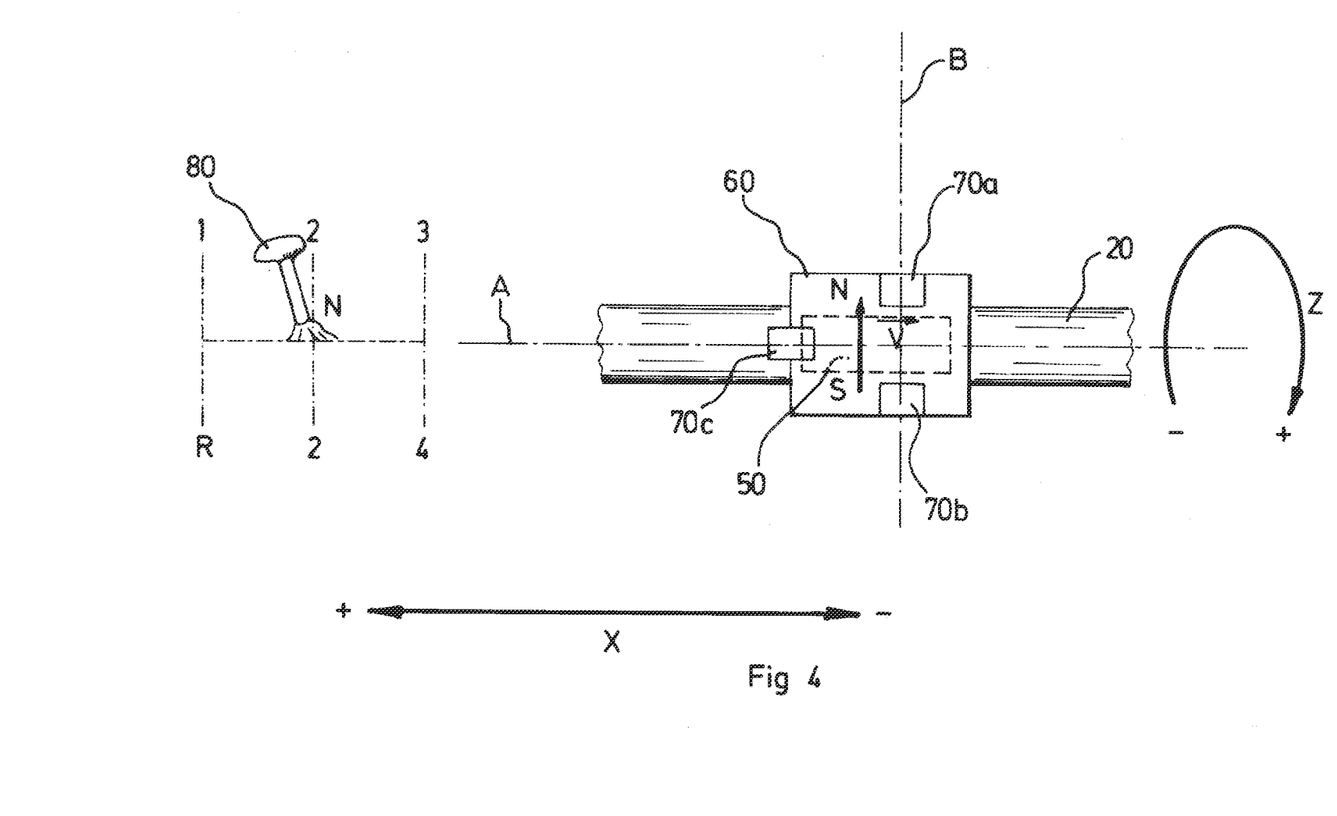
FIG. 4 is a partial schematic view of a gearbox equipped with a position sensor according to the invention.

As illustrated in FIG. 4, according to the invention, the position sensor 60 comprises three Hall effect cells 70a, 70b, and 70c, all oriented in the same direction (for example in the South-North direction, see arrow S–>N in FIG. 4). These each supply an output voltage ($V_1$, $V_2$ and $V_3$, respectively) proportional to the intensity of the magnetic field that they measure, which magnetic field is created by the magnetic element 50 situated on the gearbox selector 20, facing the position sensor 60.

According to one preferred embodiment (cf. FIG. 4), the Hall effect cells 70a, 70b, 70c are coplanar, in a plane defined by the longitudinal axis A and the transverse axis B, and positioned in such a manner that the two cells 70a, 70b are aligned on the transverse axis B perpendicular to the longitudinal axis A of the gearbox selector 20. The two cells 70a, 70b have a first gap e1 between them along this transverse axis B. The third Hall effect cell 70c is positioned on the longitudinal axis A, in other words perpendicularly to the transverse axis B, passing through the other two Hall effect cells 70a, 70b. The third Hall effect cell 70c has a second gap e2 on the longitudinal axis A with respect to the position of the other two cells 70a, 70b on this axis. In this configuration, the output voltages produced by the first Hall effect cell 70a and the second Hall effect cell 70b ($V_1$ and $V_2$, respectively) are two sinusoids the arctangent of whose ratio allows the rotational position of the magnetic element 50 to be determined (cf. FIG. 5). This is known from the prior art and has been explained previously.

Figure 5:
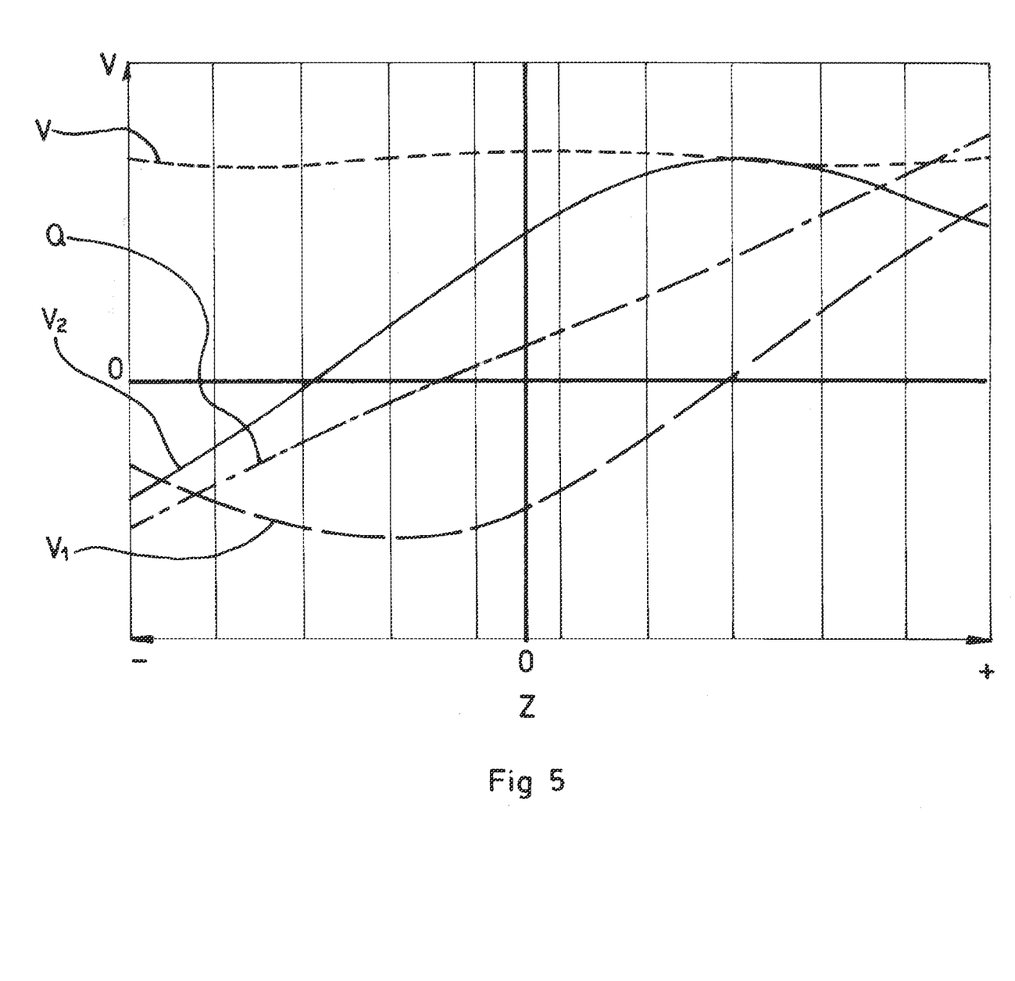
FIGS. 5 and 6 are graphical representations of the measurements of the positioning of the gearbox selector according to the invention.

In FIG. 5, the abscissa axis shows the value in degrees of the rotation of the gearbox selector 20 in the main direction Z, and the ordinate axis shows the value of the output voltage supplied by the Hall effect cells 70a and 70b. The output voltages of the first Hall cell 70a and of the second Hall cell 70b, in other words $V_1$ and $V_2$, are therefore represented in the form of sinusoids and the arctangent of the ratio of these two voltages, Q, is represented in the form of a straight line whose values are proportional to the rotational movement of the magnetic element 50 in the main direction Z.

The invention furthermore uses the geometric mean V of these two voltages $V_1$ and $V_2$, defined by:

$$V = \sqrt{V_1^2 + V_2^2} \qquad (1)$$

together with the output voltage $V_3$ of the third Hall effect cell 70c, in order to determine the translational position in the secondary direction X of the gearbox selector.

As illustrated in FIG. 5, this geometric mean V is practically insensitive to the rotational movement in the main direction Z of the magnetic element 50. By using this feature and by dividing the output voltage of the third Hall effect cell $V_3$ by this geometric mean V, a ratiometric ratio P is obtained which varies almost linearly with the translational movement in the secondary direction X of the magnetic element 50. The ratiometric ratio P is therefore defined by:

$$P = \frac{V_3}{V} \qquad (2)$$

Figure 6:
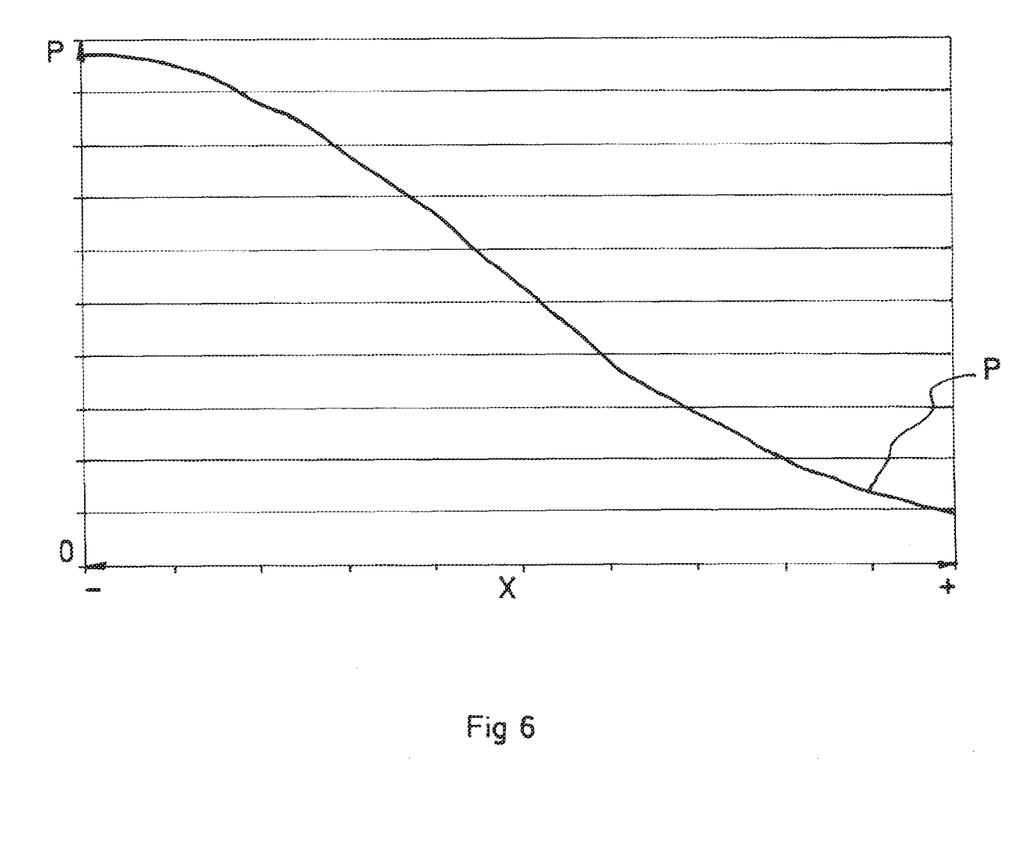

In FIG. 6, the abscissa axis represents the value of the translational movement in the secondary direction X of the magnetic element 50, and the ordinate axis represents the value of the ratiometric ratio P. It is clearly apparent that the curve representing the ratiometric ratio P corresponds to a straight line, whose values are proportional to the translational movement of the magnetic element 50 in the secondary direction X. This straight line therefore allows the translational movement effected by the magnetic element 50 to be directly determined for each value of P.

The ratiometric ratio P can be generalized and defined in the following manner:

$$P = k * \left( \frac{V_3 + k_1 * V}{V + k_3 * V_3} \right) \qquad (3)$$

with k, $k_1$ and $k_3$ being constants.

Indeed, for any value of k, $k_1$ and $k_3$, the ratiometric ratio P is represented by a straight line whose values are proportional to the translational movement in the secondary direction X of the magnetic element 50. The user can thus choose the values of k, $k_1$ and $k_3$ in order to obtain the desired measurement precision, depending on the embodiment envisioned. This adjustment allows the user to compensate for the design parameter tolerances of the various elements of this device (size, positioning of the magnet for example), or the separations between the position sensor 60 and the magnetic element 50, or again the measurement tolerances of the Hall effect cells 70a, 70b, 70c.

Thus, the key addition of a third Hall effect cell 70c within the same position sensor 60 as that used for determining the rotational movement of the gearbox selector 20 then allows the translational movement of the gearbox selector 20 to also be determined. It is therefore no longer necessary to include an additional sensor 600 within the housing 10 of the gearbox 30, equipped with one or two Hall effect cells, together with a second magnetic element 500, in order to perform this determination, as was the case in the prior art.

Advantageously, the idea of the invention is to linearize the geometric mean V in order to obtain a ratiometric ratio P having a better correlation with respect to the movement of the magnetic element 50. This linearization can be effected in a simple manner such as for example by using a moving average or a correction table.

Of course, the positioning of the magnetic element 50 with regards to the position sensor 60, together with the location of the Hall effect cells 70a, 70b, 70c within the latter, affects the precision of determination of the translational movement of the gearbox selector 20 in the secondary direction X. Consequently, an improvement of the invention consists in setting design parameters for each of following elements, prior to the calculation of the ratiometric ratio P:

dimensions of the magnetic element 50,
gaps e1 and e2, along the longitudinal axis A and transverse axis B, between each of the three Hall effect cells 70a, 70b, 70c,
orientation, along the longitudinal axis A and transverse axis B, of each of the Hall effect cells 70a, 70b, 70c,
gap between the magnetic element 50 and the measurement plane of the Hall effect cells 70a, 70b, 70c,
according to a law of variation of the voltage measured at the output of each Hall effect cell 70a, 70b, 70c, which itself is a function of the position of the magnetic element 50 with respect to said Hall effect cell.

This setting of the design parameters thus allows the user to obtain the desired measurement precision.

The method, according to the invention therefore allows the position of a magnetic element 50, situated on a gearbox selector 20 of the gearbox 30 of an automobile vehicle, to be determined, said method comprising:
the use of three Hall effect cells 70a, 70b, 70c situated within the position sensor 60 and measuring, in the same direction, the magnetic field $\vec{V}$ generated by the magnetic element 50, disposed in such a manner that two cells are spaced out over the same transverse axis and the third cell is spaced from the other two along the longitudinal axis, said method furthermore comprising:
a step consisting in calculating a ratiometric ratio P between the first voltage $V_1$, second voltage $V_2$ and third voltage $V_3$ measured at the respective outputs of the first Hall effect cell 70a, second Hall effect cell 70b and third Hall effect cell 70c,
a step consisting in deducing the position of the magnetic element in the secondary direction of movement of the gearbox selector, the ratio P varying linearly with the position of the magnetic element in the secondary direction of movement of the gearbox selector.

It is of course possible to use three identical Hall effect cells 70a, 70b, 70c in order to simplify the aforementioned design parameter setting.

The invention can be implemented by using Hall effect cells 70a, 70b, 70c situated within the same position sensor 60, but non-coplanar. Similarly, the configuration of these Hall effect cells 70a, 70b, 70c, within the position sensor 60, along the longitudinal axis A and the transverse axis B, can be arbitrary, as long as they measure the magnetic field $\vec{V}$ in the same direction, in other words they are oriented in the same direction and they supply an output voltage proportional to the intensity of this magnetic field $\vec{V}$. As previously explained, the choice of the constants k, $k_1$ and $k_3$ allows the user to adapt the ratiometric ratio P in order to obtain the desired precision independently of the position of the Hall effect cells 70a, 70b, and 70c within the position sensor 60.

It should be noted that this method is applicable to both gearboxes 30 of front-wheel-drive vehicles and to gearboxes 30 of rear-drive vehicles. The difference between these two types of gearboxes 30 resides in the orientation of the directions of movement of the gearbox selector. Thus, the main direction and the secondary direction of movement are reversed, and in the case of a gearbox of a rear-drive vehicle, the main direction of movement is the translation and the secondary direction is the rotation of the gearbox selector 20.

Embodiments of the invention may also be considered comprising a gearbox 30 having more or less than six speeds. The invention is of course applicable to any configuration or type of gearbox (mechanical, automatic, automated, etc.).

It goes without saying that the invention is not limited to the embodiment described and shown which has only been presented by way of example.

The invention claimed is:

1. A method for determining the position of a magnetic element, situated on a gearbox selector of a gearbox of an automobile vehicle, generating a magnetic field, said gearbox selector moving in two directions with respect to a longitudinal axis, a main direction, and a secondary direction, the magnetic element being situated facing a position sensor including three Hall effect cells, the method comprising:
measuring a first voltage, a second voltage, and a third voltage at the respective outputs of a first one of the Hall effect cells, a second one of the Hall effect cells, and a third one of the Hall effect cells;
using the three Hall effect cells oriented in the same direction to measure the magnetic field and positioned in the following manner:
two of the Hall effect cells are aligned on a transverse axis perpendicular to the longitudinal axis of the gearbox selector and have a first gap between the two Hall effect cells along the transverse axis, and
the third Hall effect cell is positioned on the longitudinal axis, perpendicularly to the transverse axis, passing through the other two Hall effect cells, the third Hall effect cell having a second gap along the longitudinal axis with respect to the position of the first two Hall effect cells on the longitudinal axis;
calculating a ratiometric ratio between the first voltage, the second voltage, and the third voltage defined by:

$$P = k * \left( \frac{V_3 + k_1 * V}{V + k_3 * V_3} \right)$$

with $V = \sqrt{V_1^2 + V_2^2}$, the geometric mean between the first voltage and the second voltage, and k, $k_1$, and $k_3$ being constants associated with design parameters of the position sensor; and
deducing the position of the magnetic element in the secondary direction of movement of the gearbox selector of the gearbox, the ratio P varying linearly with the position of the magnetic element in the secondary direction of movement of the gearbox selector of the gearbox.

2. The method as claimed in claim 1, wherein the three Hall effect cells are coplanar in a plane defined by the longitudinal axis and the transverse axis.

3. The method as claimed in claim 1, wherein k=1, $k_1$=0 and $k_3$=0, and
the ratiometric ratio P is expressed as:

$$P = \frac{V_3}{V}.$$

4. The method as claimed in claim 2, wherein the geometric mean between the first measured voltage and the second measured voltage is linearized.

5. The method as claimed in claim 1, further comprising setting the design parameters of at least one of the following elements:
dimensions of the magnetic element (50),
one or more of the first gap and the second gap along the longitudinal axis and a transverse axis, between each of the three Hall effect cells, a gap, along the longitudinal axis and the transverse axis, between the magnetic element and the measurement plane of the Hall effect cells, according to a law of variation of the voltage measured at the output of each Hall effect cell, itself a function of the position of the magnetic element with respect to said Hall effect cell.

6. The method as claimed in claim 1, wherein the Hall effect cells used are identical.

7. The method as claimed in claim 1, wherein the main direction is a direction of rotation of the magnetic element about the longitudinal axis.

8. The method as claimed in claim 7, wherein the secondary direction is a direction of translation of the magnetic element along the longitudinal axis.

9. The method as claimed in claim 1, wherein the main direction is a direction of translation of the magnetic element along the longitudinal axis.

10. The method as claimed in claim 9, wherein the secondary direction is a direction of rotation of the magnetic element about the longitudinal axis.

11. The method as claimed in claim 1, further comprising calculating the arctangent of the ratio between the first voltage and the second voltage in order to determine the position of the magnetic element in the main direction of movement of the gearbox selector of the gearbox.

12. A device for determining the position of a magnetic element, situated on a gearbox selector of a gearbox of an automobile vehicle, generating a magnetic field, said gearbox selector moving in two directions with respect to a longitudinal axis, a main direction, and a secondary direction, the magnetic element being situated facing a position sensor including three Hall effect cells, the device comprising:

means for measuring a first voltage, a second voltage, and a third voltage at the respective outputs of a first one of the Hall effect cells, a second one of the Hall effect cells, and a third one of the Hall effect cells, the three Hall effect cells being oriented in the same direction and measuring the magnetic field in the same direction and being positioned in the following manner:

two of the Hall effect cells are aligned on a transverse axis perpendicular to the longitudinal axis of the gearbox selector and have a first gap between the two Hall effect cells along the transverse axis, and the third Hall effect cell is positioned on the longitudinal axis, perpendicularly to the transverse axis, passing through the other two Hall effect cells, the third Hall effect cell having a second gap along the longitudinal axis with respect to the position of the first two Hall effect cells on the longitudinal axis;

means for calculating a ratiometric ratio between the first voltage, the second voltage, and the third voltage defined by:

$$P = k * \left( \frac{V_3 + k_1 * V}{V + k_3 * V_3} \right)$$

with $V = \sqrt{V_1^2 + V_2^2}$, the geometric mean between the first voltage and the second voltage, and k, $k_1$, and $k_3$ being constants associated with design parameters of the position sensor; and means for deducing the position of the magnetic element in the secondary direction of movement of the gearbox selector of the gearbox, the ratio P varying linearly with the position of the magnetic element in the secondary direction of movement of the gearbox selector for the gearbox.

13. The position sensor for the gearbox selector of the automobile vehicle implementing the method as claimed in claim 1.

* * * * *